United States Patent
Takada et al.

(10) Patent No.: US 7,529,414 B2
(45) Date of Patent: May 5, 2009

(54) MOVING IMAGE RECORDING METHOD

(75) Inventors: Shinichi Takada, Osaka (JP);
Toshinobu Hatano, Kyoto (JP)

(73) Assignee: Panasonic Corporation, Osaka (JP)

( * ) Notice: Subject to any disclaimer, the term of this patent is extended or adjusted under 35 U.S.C. 154(b) by 652 days.

(21) Appl. No.: 11/157,932

(22) Filed: Jun. 22, 2005

(65) Prior Publication Data
US 2005/0286783 A1      Dec. 29, 2005

(30) Foreign Application Priority Data
Jun. 24, 2004    (JP)    ............................ P2004-186218

(51) Int. Cl.
*G06K 9/36*    (2006.01)
(52) U.S. Cl. .................................... 382/232
(58) Field of Classification Search ................ 382/232, 382/236, 238–240, 243–250; 348/384.1, 348/394.1–395.1, 400.1–404.1, 407.1–416.1, 348/420.1–421.1, 424.2, 430.1–431.1; 375/240.01–240.03, 375/240.12–240.24
See application file for complete search history.

(56) References Cited

U.S. PATENT DOCUMENTS 5,917,949 A  *  6/1999  Chun et al. ................ 382/236

6,307,974 B1 * 10/2001 Tsujimoto .................... 382/239
7,127,111 B2 * 10/2006 Fukuhara et al. ............. 382/232
7,127,117 B2 * 10/2006 Sano et al. ................... 382/240
7,302,105 B2 * 11/2007 Kajiwara ..................... 382/240
7,310,447 B2 * 12/2007 Yano et al. ................... 382/236

FOREIGN PATENT DOCUMENTS

JP    2000-333130    11/2000

OTHER PUBLICATIONS

Chinese Office Action issued in Chinese Patent Application No. CN 200510080025.8, mailed Feb. 29, 2008.

* cited by examiner

*Primary Examiner*—Jose L Couso
(74) *Attorney, Agent, or Firm*—McDermott Will & Emery LLP

(57) ABSTRACT

The present invention relates to an image processing device for compressing and expanding image data by means of the JPEG method when the image data is subjected to a moving image recording operation or a moving image reproducing operation, wherein the image is compressed so that positions of a block noise in a first frame image and a block noise in a second frame image are different in the moving image recording operation, while the image data is JPEG-expanded and then image-displayed based on information relating to the difference of the block noise obtained in the moving image recording operation when the moving image recorded in the moving image recording operation is reproduced.

24 Claims, 5 Drawing Sheets

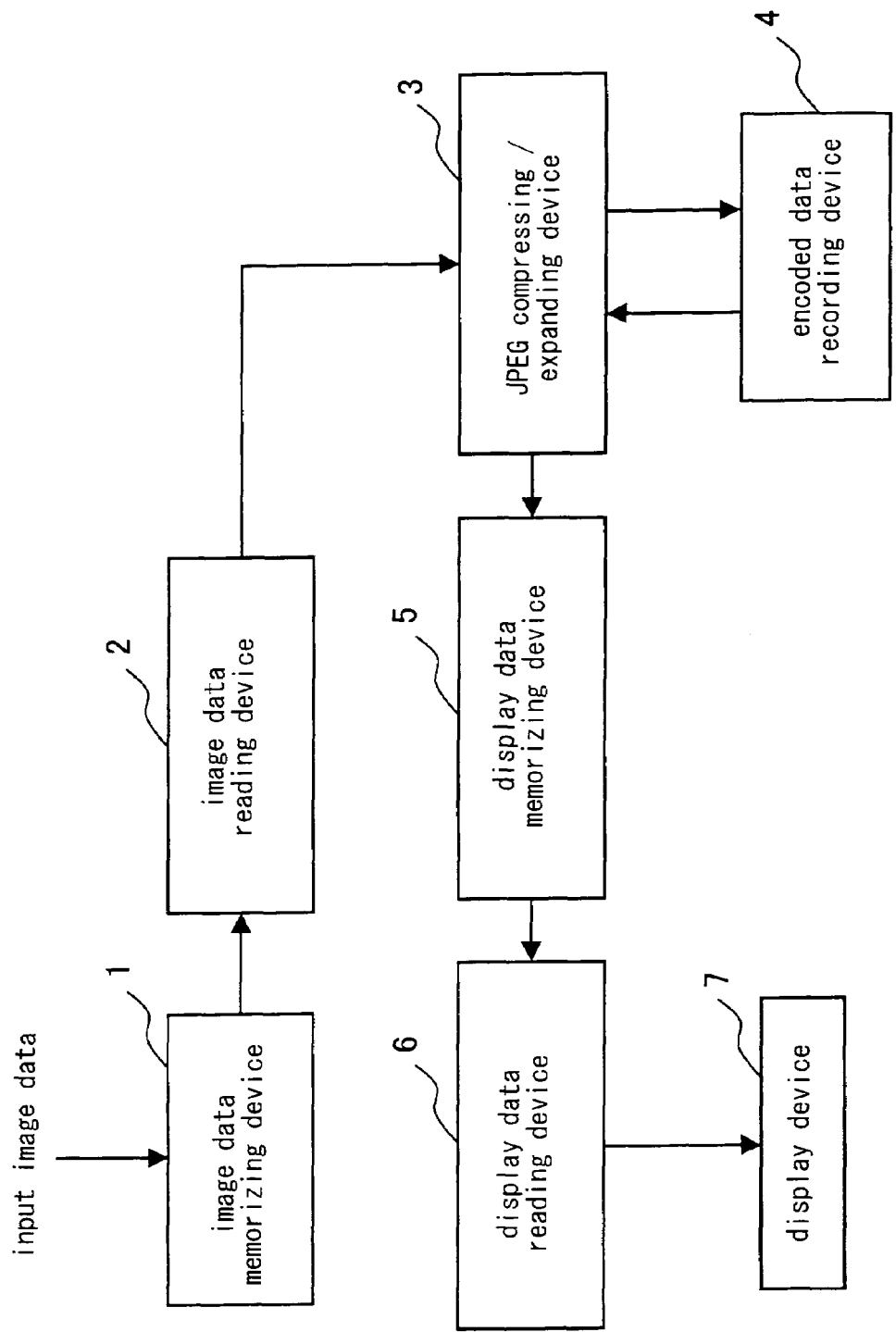

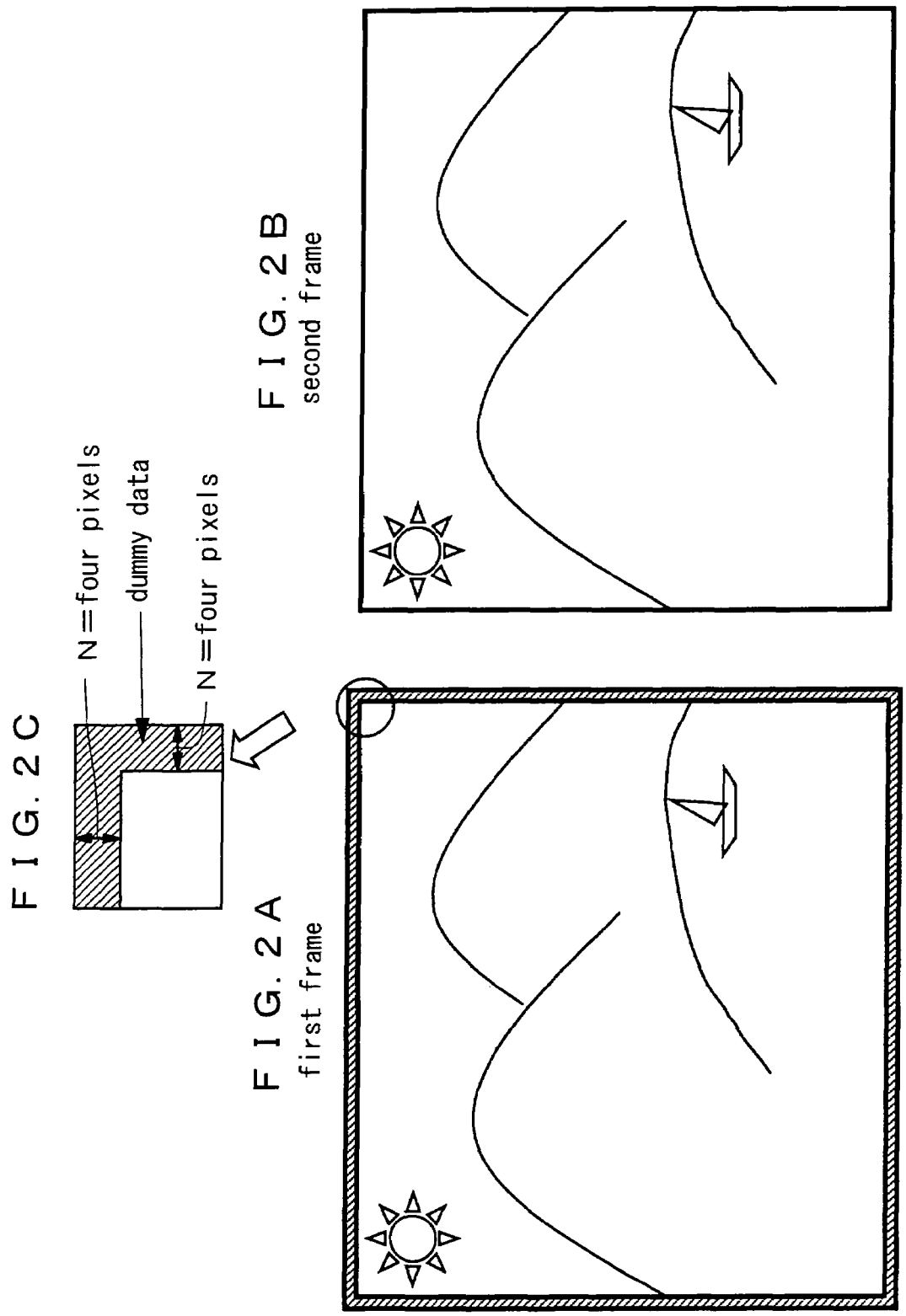

second frame expanded data first frame expanded data first frame display data second frame display data second frame display data
(enlarged view)

first frame display data
(enlarged view)

MOVING IMAGE RECORDING METHOD

FIELD OF THE INVENTION

The present invention relates to a moving image recording method and a moving image recording apparatus in which image data is compressed and recorded as encoded data and a moving image reproducing method and a moving image reproducing apparatus in which the encoded data is read and expanded to be reproduced.

BACKGROUND OF THE INVENTION

Conventionally, the motion JPEG format is adopted as a simplified moving image recording facility installed in a digital camera or the like. To describe the method, a moving image recording/reproducing facility is realized in such manner that each image data is compressed, and then, each image data is thereafter continuously expanded and displayed in reproducing the image data as the moving image, thereby realizing (for example, see No. 2000-333130 of the Publication of the Unexamined Japanese Patent Applications).

In the case of the foregoing conventional technology wherein each image data is JPEG-compressed, when a compression rate is increased in order to extend a moving image recording time, an encoding amount is reduced and an image quality is thereby unfavorably deteriorated because a block noise, which is a characteristic of the JPEG compression, is conspicuously generated in the image.

Further, when the JPEG compression rate is reduced so as to solve the problem, the encoding amount is increased, which leads to an increased memory capacity.

SUMMARY OF THE INVENTION

Therefore, a main object of the present invention is to make a block noise inconspicuous to thereby realize a high quality in a moving image.

In order to solve the foregoing problem, in a moving image recording operation of image data, the moving image is recorded by compressing the image in such manner that positions of the block noises are different in a first frame image and a second frame image. Further, in a moving image reproducing operation, the image data is expanded, and the image is thereafter displayed based on information relating to the difference of the block noise in the moving image recording operation.

In the moving image recording operation, an image resulting from a digital data to be recorded including unnecessary dummy data (dummy frame) of N pixels in width (N is an integer) on an outer thereof is compressed in one of the frames, and the moving image is accordingly recorded. In the moving image reproducing operation, the image additionally provided with the dummy data is displayed in such manner that the dummy data is removed after the data expansion.

Further, in the moving image recording operation, a compression rate is changed in the first frame and the second frame, and one of the frames is recorded as a high-quality image.

Below is given a more specific description.

A moving image recording method according to the present invention is a moving image recording method for compressing image data and recording the compressed image data as encoded data, wherein the encoded data includes a first frame comprising a plurality of blocks and a second frame comprising a plurality of blocks and chronologically continuous relative to the first frame, and an inter-block border position is made to be different in the first frame and the second frame.

More specifically, the moving image recording method according to the present invention includes a step of memorizing the inputted image data, a step of reading the memorized image data as the first frame comprising the plurality of blocks, a step of compressing and recording the read image data of the first frame, a step of reading the memorized image data of the first frame as image data of the second frame comprising the plurality of blocks and chronologically continuous relative to the first frame, the second frame further shifting an inter-block border position thereof relative to the first frame, a step of compressing and recording the read image data of the second frame, and a step of alternately repeating the respective steps.

A moving image recording method according to the present invention is a moving image recording method for compressing image data and recording the compressed image data as encoded data, wherein the encoded data includes a first frame comprising a plurality of blocks and a second frame comprising a plurality of blocks and chronologically continuous relative to the first frame, and the image data is compressed after dummy data of N pixels in width (N is an integer) is appended to the image data on an outer side thereof when the image data is compressed to the first frame.

More specifically, the moving image recording method according to the present invention includes a step of memorizing the inputted image data, a step of reading the memorized image data as the first frame comprising the plurality of blocks, a step of appending the dummy data of N pixels in width (N is an integer) to the read image data of the first frame on the outer side thereof and then compressing and recording the image data, a step of reading the memorized image data as the second frame comprising the plurality of blocks and chronologically continuous relative to the first frame, a step of compressing and recording the read image data of the second frame, and a step of alternately repeating the respective steps.

A moving image recording method according to the present invention is a moving image recording method for compressing image data and recording the compressed image data as encoded data, wherein the encoded data includes a first frame comprising a plurality of blocks and a second frame comprising a plurality of blocks and chronologically continuous relative to the first frame, and the image data is compressed after dummy data of N pixels in width (N is an integer) is appended to the image data on an outer side thereof when the image data is compressed to the second frame.

More specifically, the moving image recording method according to the present invention includes a step of memorizing the inputted image data, a step of reading the memorized image data as the first frame comprising the plurality of blocks, a step of compressing and recording the read image data of the first frame, a step of reading the memorized image data as the second frame comprising the plurality of blocks and chronologically continuous relative to the first frame, a step of appending the dummy data of N pixels in width (N is an integer) to the read image data of the second frame on the outer side thereof and then compressing and recording the image data, and a step of alternately repeating the respective steps.

As typical examples in the foregoing moving image recording methods, a size of the block is by eight pixels×eight pixels and the N is a multiple of four.

Further, pixel data corresponding to a pixel, which is the most positionally approximate in the image data, is preferably used as the dummy data.

A moving image recording method according to the present invention is a moving image recording method for compressing image data and recording the compressed image data as encoded data, wherein the encoded data includes a first frame comprising a plurality of blocks and a second frame comprising a plurality of blocks and chronologically continuous relative to the first frame, and the image data is compressed by changing a compression rate changed in the first frame and the second frame and recorded.

More specifically, the moving image recording method according to the present invention includes a step of memorizing the inputted image data, a step of reading the memorized image data as the first frame comprising the plurality of blocks, a step of compressing and recording the read image data of the first frame, a step of reading the memorized image data as the second frame comprising the plurality of blocks and chronologically continuous relative to the first frame, a step of compressing the read image data of the second frame at a compression rate different to that of the first frame and recording the compressed image data, and a step of alternately repeating the respective steps.

As a typical example in the foregoing moving image recording method, the motion JPEG format is employed as a format of compressing the image data.

The present invention can be developed as a moving image recording apparatus as below.

A moving image recording apparatus according to the present invention is a moving image recording apparatus for compressing image data and recording the compressed image data as encoded data, comprising an image data memorizing device for memorizing the inputted image data, an image data reading device for reading the image data memorized in the image data memorizing device as a first frame and a second frame each comprising a plurality of blocks, the first and second frames being chronologically continuous relative to each other, in the state in which an inter-block border position is changed in the respective frames, and a compressing device for compressing and recording the image data of the first frame and the second frame read by the image data reading device.

A moving image recording apparatus according to the present invention is a moving image recording apparatus for compressing image data and recording the compressed image data as encoded data, comprising an image data memorizing device for memorizing the inputted image data, an image data reading device for reading the image data memorized in the image data memorizing device as a first frame and a second frame each comprising a plurality of blocks, the first and second frames being chronologically continuous relative to each other, and a compressing device for appending dummy data of N pixels in width (N is an integer) to the image data of one of the first frame and the second frame read by the image data reading device on an outer side thereof and thereafter compressing and recording the image data of the respective frames.

A moving image recording apparatus according to the present invention is a moving image recording apparatus for compressing image data and recording the compressed image data as encoded data, comprising an image data memorizing device for memorizing the inputted image data, an image data reading device for reading the image data memorized in the image data memorizing device as a first frame and a second frame each comprising a plurality of blocks, the first and second frames being chronologically continuous relative to each other, and a compressing device for compressing the image data of the first frame and the second frame read by the image data reading device respectively at different compression rates and recording the compressed image data.

As a typical example in the foregoing moving image recording apparatuses, the motion JPEG format is employed as a format of compressing the image data.

The present invention as a moving image reproducing method relates to a moving image reproducing method for reading encoded data recorded in the state in which a first frame comprising a plurality of blocks and additionally provided with dummy data of N pixels in width (N is an integer) on an outer side thereof and a second frame comprising a plurality of blocks and chronologically continuous relative to the first frame are included in the encoded data, expanding the read encoded data by means of the JPEG method and reproducing the expanded encoded data as image data, wherein the image data whose first frame is expanded is reproduced in the state that the dummy data on the outer side thereof is removed, while the image data whose second frame is expanded is reproduced as it is.

More specifically, the moving image reproducing method according to the present invention includes a step of reading the encoded data of the first frame additionally provided with the dummy data of N pixels in width (N is an integer) on the outer side thereof, a step of expanding the read encoded data of the first frame and memorizing the expanded encoded data as display data, a step of reading the encoded data of the second frame, a step of expanding the read encoded data of the second frame and memorizing the expanded encoded data as display data, a step of reading and displaying/outputting the memorized display data of the first frame in the state that the dummy data on the outer side thereof is removed, a step of reading and displaying/outputting the memorized display data of the second frame, and a step of alternately repeating the respective steps.

A moving image reproducing method according to the present invention is a moving image reproducing method for reading encoded data recorded in the state in which a first frame comprising a plurality of blocks and a second frame comprising a plurality of blocks, chronologically continuous relative to the first frame and additionally provided with dummy data of N pixels in width (N is an integer) on an outer side thereof are included in the encoded data, expanding the read encoded data by means of the JPEG method and reproducing the expanded encoded data as image data, wherein the image data whose first frame is expanded is reproduced as it is, while the image data whose second frame is expanded is reproduced in the state that the dummy data on the outer side thereof is removed.

More specifically, the moving image reproducing method according to the present invention includes a step of reading the encoded data of the first frame, a step of expanding the read encoded data of the first frame and memorizing the expanded encoded data as display data, a step of reading the encoded data of the second frame additionally provided with the dummy data of N pixels in width (N is an integer) on the outer side thereof, a step of expanding the read encoded data of the second frame and memorizing the expanded encoded data as display data, a step of reading and displaying/outputting the memorized display data of the first frame, a step of reading and displaying/outputting the memorized display data of the second frame in the state that the dummy data on the outer side thereof is removed, and a step of alternately repeating the respective steps.

As typical examples in the foregoing moving image reproducing methods, a size of the block is by eight pixels×eight pixels and the N is a multiple of four.

As a typical example in the foregoing moving image reproducing methods, the motion JPEG format is employed as a format of compressing the image data.

The present invention can be developed as a moving image reproducing apparatus as below.

A moving image reproducing apparatus according to the present invention comprises a JPEG expanding device for reading and expanding encoded data of a first frame additionally provided with dummy data of N pixels in width (N is an integer) on an outer side thereof and encoded data of a second frame chronologically continuous relative to the first frame and not provided with the dummy data, a display data memorizing device for memorizing the data of the first frame and the second frame expanded by the JPEG expanding device as display data, and a display data reading device for reading and displaying/outputting the display data of the first frame memorized in the display data memorizing device in the state that the dummy data on the outer side thereof is removed and reading and displaying/outputting the display data of the second frame.

A moving image reproducing apparatus according to the present invention comprises a JPEG expanding device for reading and expanding encoded data of a first frame not provided with dummy data and encoded data of a second frame chronologically continuous relative to the first frame and additionally provided with dummy data of N pixels in width (N is an integer) on an outer side thereof, a display data memorizing device for memorizing the data of the first frame and the second frame expanded by the JPEG expanding device as display data, and a display data reading device for reading and displaying/outputting the display data of the first frame memorized in the display data memorizing device and reading and displaying/outputting the display data of the second frame in the state that the dummy data on the outer side thereof is removed.

According to the foregoing constitution, the motion JPEG format is employed as a format of compressing the image data.

BRIEF DESCRIPTION OF THE DRAWINGS

The present invention is illustrated be way of example and not limitation in the figures of the accompanying drawings, in which like references indicate similar elements and in which:

FIG. 1 is a block diagram illustrating a constitution of a moving image recording/reproducing apparatus according to a preferred embodiment of the present invention;

FIGS. 2 are illustrations of image data compressed in a first frame compressing operation and a second frame compressing operation in a moving image recording operation in the moving image recording/reproducing apparatus according to the preferred embodiment;

DETAILED DESCRIPTION OF A PREFERRED EMBODIMENT

Figure 3B:
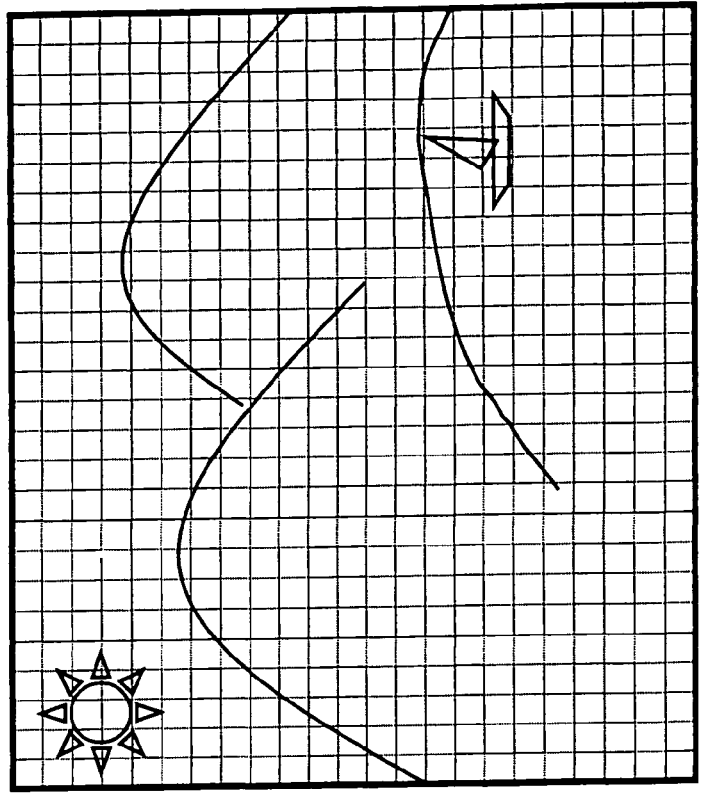
FIGS. 3 are illustrations of first frame expanded data and second frame expanded data in a moving image reproducing operation in the moving image recording/reproducing apparatus according to the preferred embodiment.

Hereinafter, a preferred embodiment of the present invention is described referring to the drawings.

FIG. 1 is a block diagram illustrating a constitution of a moving image recording/reproducing apparatus according to a preferred embodiment of the present invention. Referring to reference numerals in FIG. 1, 1 denotes an image data memorizing device for memorizing inputted image data, 2 denotes an image data reading device for reading the image data to be compressed from the image data memorizing device 1, 3 denotes a JPEG compressing/expanding device for compressing or expanding the image data, 4 denotes an encoded data recording device for memorizing encoded data compressed by the JPEG compressing/expanding device 3, 5 denotes a display data memorizing device for memorizing display data expanded by the JPEG compressing/expanding device 3 and thereby generated, 6 denotes a display data reading device for reading the memorized display data from the display data memorizing device 5, and 7 denotes a display device for displaying the display data read by the display data reading device 6.

Next, a moving image recording operation of the moving image recording/reproducing apparatus comprising the foregoing components is described below.

The image data memorized in the image data memorizing device 1 is read by the image data reading device 2, compressed by the JPEG compressing/expanding device 3 to be encoded, and memorized in the encoded data memorizing device 4. At that time, the image data reading device 2 reads the image data to be recorded of the first frame in a relatively large view angle size in which dummy data of horizontally and vertically N pixels (N is an integer) is included. In the present embodiment, for example, N is set to four. The foregoing operation is referred to as a first frame compressing operation. Next, the image data to be recorded of the second frame is read in an original view angle size thereof, which is referred to as a second frame compressing operation.

FIG. 2A shows an image read by the image data reading device 2 in the first frame compressing operation. FIG. 2B shows an image read by the image data reading device 2 in the second frame compressing operation. Thus, the moving image recording operation is carried out by alternately repeating the first frame compressing operation and the second frame compressing operation.

Next, a moving image reproducing operation is described.

The encoded data compressed in the moving image recording operation and memorized in the encoded data recording device 4 is expanded by the JPEG compressing/expanding device 3 and sequentially memorized in the display data memorizing device 5 as display data. The display data memorized in the display data memorizing device 5 is read by the display data reading device 6 and displayed by the display device 7.

Referring to the display data memorized in the display data memorizing device 5, the display data resulting from the image data, which is compressed in the first frame compressing operation and expanded, includes the dummy data. The foregoing display data is referred to as a first frame expanded data. The display data resulting from the image data, which is compressed in the second frame compressing operation and expanded, does not include any dummy data. The foregoing display data is referred to as a second frame expanded data.

Figure 3A:
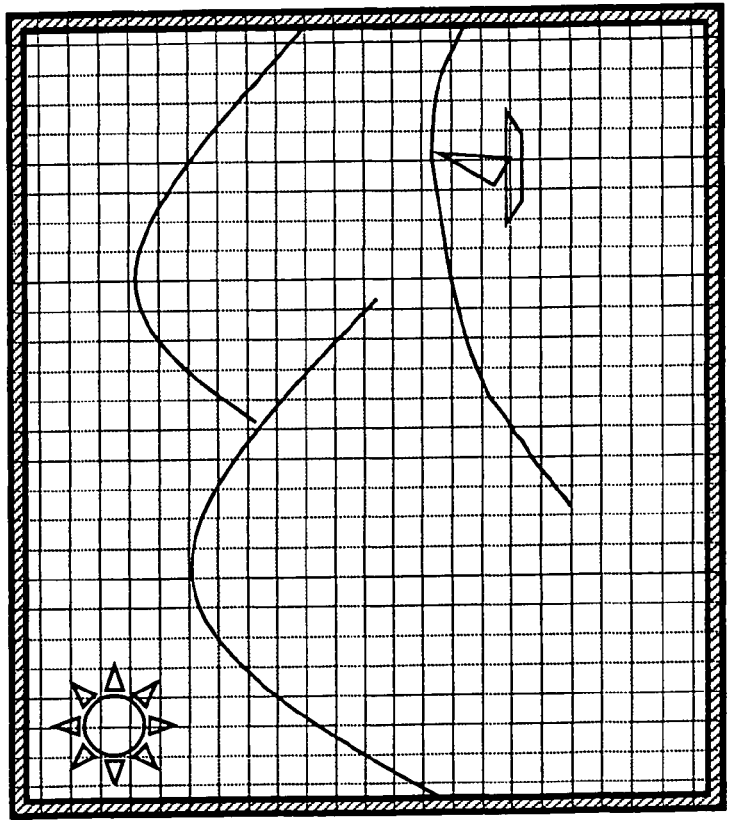

FIG. 3A shows the first frame expanded data, while FIG. 3B shows the second frame expanded data.

As shown in FIGS. 3A and 3B, the first frame expanded data and the second frame expanded data undergo the generation of a noise, which appears to be a streak, in each block of horizontal eight pixels and vertical eight pixels. The noise is a JPEG-specific phenomenon which becomes particularly conspicuous when the data is expanded if a compression rate is increased in the JPEG compression.

The display data memorizing device 5 alternately memorizes the first frame expanded data and the second frame expanded data, in which the block noise is remarkably seen.

The display data reading device 6 reads the image data avoiding the dummy data when reading the first frame expanded data. The image data read in the foregoing manner is referred to as a first frame display data. The display data reading device 6 directly reads the image data from a leading position of the image when reading the second frame expanded data. The image data read in the foregoing manner is referred to as a second frame display data.

Figure 4A:
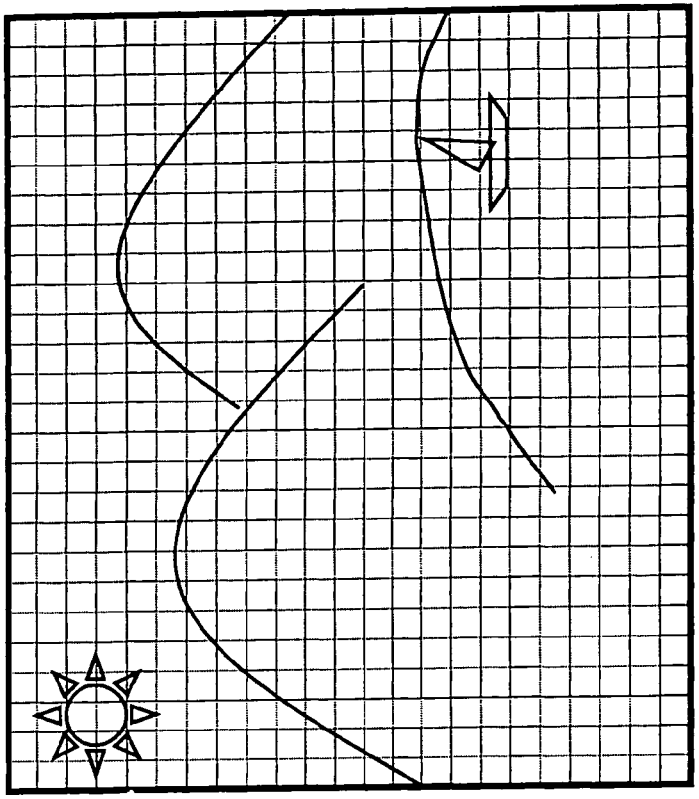
FIGS. 4 are illustrations of first frame display data and second frame display data in the moving image reproducing operation in the moving image recording/reproducing apparatus according to the preferred embodiment.
Figure 4B:
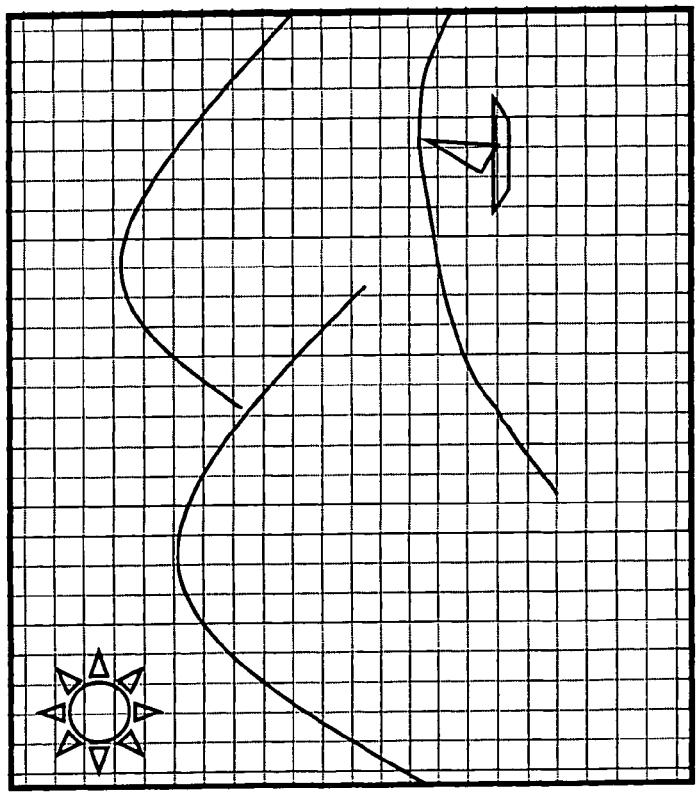
Figure 5B:
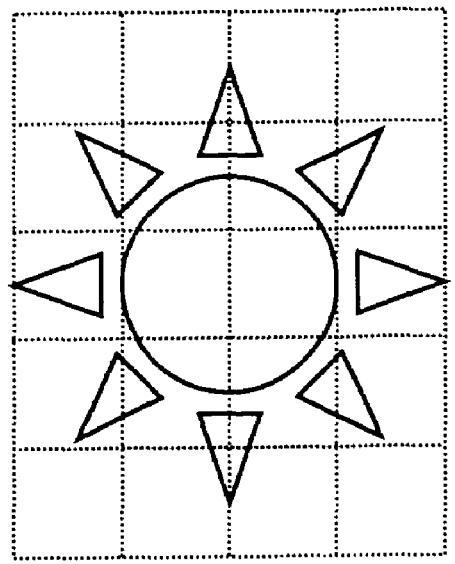
FIGS. 5 are enlarged views of a part of the first frame display data and the second frame display data in FIG. 4.
Figure 5A:
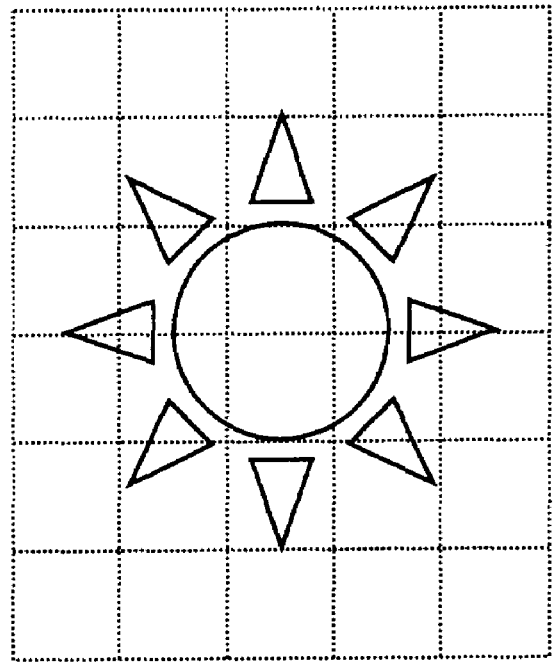

FIG. 4A shows the first frame display data, while FIG. 4B shows the second frame display data. FIGS. 5A and 5B respectively enlarge a part where the sun is shown in FIGS. 4A and 4B. As shown in FIG. 5, a position of the block noise in the first frame display data and a position of the block noise in the second frame display data are different to each other. It is learnt that the positions of the respective block noises are in such a relationship that they are balanced out relative to each other.

Based on the foregoing description, when the first frame display data and the second frame display data are alternately displayed at a high speed by the display device 7, the respective block noises are balanced out to be inconspicuous in the state in which the image is seen by human eyes. As a result, the image is recognized as a high-quality image.

Further, when the dummy data used in the first frame compressing operation is made to correspond to pixel data of a pixel which is the nearest to the image to be recorded, a correlation can be obtained in the image data, which favorably leads to the reduction of an encoding amount in the compressing operation.

As an alternative method, a quantization table of the JPEG compression may be manipulated so as to change the compression rates in the first frame compressing operation and the second frame compressing operation. In employing the method, the compression rate in one of the frames is reduced, while the compression rate in the other is increased. Accordingly, a high-quality image can be obtained in the frame in which the compression rate is increased while the encoding amount remains the same as in the case in which the compression rates in the first frame compressing operation and the second frame compressing operation are equal to each other. In the moving image reproducing operation, the block noise of the display data compressed at the high compression rate is balanced out by the image data compressed at the low compression rate. Additionally, when the moving image is halted in the state in which the high-quality display data is displayed in a moving image temporary halt operation, the image can be further regarded as the high-quality image. Advantageously, the display data can be used for different purposes as an image of a high quality.

While the invention has been described and illustrated in detail, it is to be clearly understood that this is intended be way of illustration and example only and is not to be taken by way of limitation, the spirit and scope of this invention being limited only be the terms of the following claims.

What is claimed is:

1. A moving image recording method using a processor for compressing image data and recording the compressed image data as encoded data, wherein the encoded data includes a first frame comprising a plurality of blocks and a second frame comprising a plurality of blocks and chronologically continuous relative to the first frame, and wherein the moving image recording method shifts at least one of the position of block noise in the first frame and the position of block noise in the second frame relative to one another so as to render the block noise less noticeable.

2. A moving image recording method using a processor for compressing image data and recording the compressed image data as encoded data, including:
   a step of memorizing the inputted image data;
   a step of reading the memorized image data as a first frame comprising a plurality of blocks;
   a step of compressing and recording the read image data of the first frame;
   a step of reading the memorized image data of the first frame as image data of the second frame comprising the plurality of blocks and chronologically continuous relative to the first frame, the second frame further shifting an inter-block border position thereof relative to the first frame; and
   a step of compressing and recording the read image data of the second frame, and a step of alternately repeating the respective steps,
   wherein the moving image recording method shifts at least one of the position of block noise in the first frame and the position of block noise in the second frame relative to one another so as to render the block noise less noticeable.

3. A moving image recording method using a processor for compressing image data and recording the compressed image data as encoded data, wherein the encoded data includes a first frame comprising a plurality of blocks and a second frame comprising a plurality of blocks and chronologically continuous relative to the first frame, and the image data is compressed after dummy data of N pixels in width (N is an integer) is appended to the image data on an outer side thereof when the image data is compressed to the first frame, wherein the moving image recording method shifts at least one of the position of block noise in the first frame and the position of block noise in the second frame relative to one another so as to render the block noise less noticeable.

4. A moving image recording method using a processor for compressing image data and recording the compressed image data as encoded data, including:
   a step of memorizing the inputted image data;
   a step of reading the memorized image data as a first frame comprising a plurality of blocks;
   a step of appending dummy data of N pixels in width (N is an integer) to the read image data of the first frame on an outer side thereof and thereafter compressing and recording the image data;
   a step of reading the memorized image data as a second frame comprising a plurality of blocks and chronologically continuous relative to the first frame;
   a step of compressing and recording the read image data of the second frame; and
   a step of alternately repeating the respective steps,
   wherein the moving image recording method shifts at least one of the position of block noise in the first frame and the position of block noise in the second frame relative to one another so as to render the block noise less noticeable.

5. A moving image recording method using a processor for compressing image data and recording the compressed image data as encoded data, wherein the encoded data includes a first frame comprising a plurality of blocks and a second frame comprising a plurality of blocks and chronologically continuous relative to the first frame, and the image data is compressed after dummy data of N pixels in width (N is an integer) is appended to the image data on an outer side thereof when the image data is compressed to the second frame, wherein the moving image recording method shifts at least one of the position of block noise in the first frame and the position of block noise in the second frame relative to one another so as to render the block noise less noticeable.

6. A moving image recording method using a processor for compressing image data and recording the compressed image data as encoded data, including:
   a step of memorizing the inputted image data;
   a step of reading the memorized image data as a first frame comprising a plurality of blocks;
   a step of compressing and recording the read image data of the first frame;
   a step of reading the memorized image data as a second frame comprising a plurality of blocks and chronologically continuous relative to the first frame;
   a step of appending dummy data of N pixels in width (N is an integer) to the read image data of the second frame on an outer side thereof and thereafter compressing and recording the image data; and
   a step of alternately repeating the respective steps,
   wherein the moving image recording method shifts at least one of the position of block noise in the first frame and the position of block noise in the second frame relative to one another so as to render the block noise less noticeable.

7. A moving image recording method as claimed in any of claims 3 through 6, wherein a size of the block is by eight pixels×eight pixels and the N is a multiple of four.

8. A moving image recording method as claimed in any of claims 3 through 6, wherein pixel data corresponding to the most positionally approximate pixel in the image data is used as the dummy data.

9. A moving image recording method using a processor for compressing image data and recording the compressed image data as encoded data, wherein the encoded data includes a first frame comprising a plurality of blocks and a second frame comprising a plurality of blocks and chronologically continuous relative to the first frame, and the image data is compressed by changing a compression rate changed in the first frame and the second frame and recorded so as to render block noise less noticeable.

10. A moving image recording method using a processor for compressing image data and recording the compressed image data as encoded data, including:
   a step of memorizing the inputted image data;
   a step of reading the memorized image data as a first frame comprising a plurality of blocks;
   a step of compressing and recording the read image data of the first frame;
   a step of reading the memorized image data as a second frame comprising a plurality of blocks and chronologically continuous relative to the first frame;
   a step of compressing the read image data of the second frame at a compression rate different to that of the first frame and recording the compressed image data; and
   a step of alternately repeating the respective steps so as to render block noise less noticeable.

11. A moving image recording method as claimed in any of claims 1 through 6, 9 and 10, wherein motion JPEG format is employed as a format of compressing the image data.

12. A moving image recording apparatus for compressing image data and recording the compressed image data as encoded data, comprising:
   an image data memorizing device for memorizing the inputted image data;
   an image data reading device for reading the image data memorized in the image data memorizing device as a first frame and a second frame each comprising a plurality of blocks, the first and second frames being chronologically continuous relative to each other, in a state in which an inter-block border position is changed in the respective frames; and
   a compressing device for compressing and recording the image data of the first frame and the second frame read by the image data reading device,
   wherein at least one of the position of block noise in the first frame and the position of block noise in the second frame is shifted relative to one another so as to render the block noise less noticeable.

13. A moving image recording apparatus for compressing image data and recording the compressed image data as encoded data, comprising:
   an image data memorizing device for memorizing the inputted image data;
   an image data reading device for reading the image data memorized in the image data memorizing device as a first frame and a second frame each comprising a plurality of blocks, the first and second frames being chronologically continuous relative to each other; and
   a compressing device for appending dummy data of N pixels in width (N is an integer) to the image data of one of the first frame and the second frame read by the image data reading device on an outer side thereof and thereafter compressing and recording the image data of the respective frames,
   wherein at least one of the position of block noise in the first frame and the position of block noise in the second frame is shifted relative to one another so as to render the block noise less noticeable.

14. A moving image recording apparatus for compressing image data and recording the compressed image data as encoded data, comprising:
   an image data memorizing device for memorizing the inputted image data;
   an image data reading device for reading the image data memorized in the image data memorizing device as a first frame and a second frame each comprising a plurality of blocks, the first and second frames being chronologically continuous relative to each other; and
   a compressing device for compressing the image data of the first frame and the second frame read by the image data reading device respectively at different compression rates and recording the compressed image data so as to render block noise less noticeable.

15. A moving image recording apparatus as claimed in any of claims 12 through 14, wherein motion JPEG format is employed as a format of compressing the image data.

16. A moving image reproducing method using a processor for reading encoded data recorded in a state in which a first frame comprising a plurality of blocks and additionally provided with dummy data of N pixels in width (N is an integer) on an outer side thereof and a second frame comprising a plurality of blocks and chronologically continuous relative to the first frame are included in the encoded data, expanding the read encoded data by means of JPEG method and reproducing the expanded encoded data as image data, wherein
   the image data whose first frame is expanded is reproduced in the state that the dummy data on an outer side thereof is removed, and the image data whose second frame is expanded is reproduced as it is, wherein at least one of the position of block noise in the first frame and the position of block noise in the second frame is shifted relative to one another so as to render the block noise less noticeable.

17. A moving image reproducing method, including using a processor for implementing the steps of:
a step of reading encoded data of a first frame additionally provided with dummy data of N pixels in width (N is an integer) on an outer side thereof;
a step of expanding the read encoded data of the first frame and memorizing the expanded encoded data as display data;
a step of reading encoded data of a second frame;
a step of expanding the read encoded data of the second frame and memorizing the expanded encoded data as display data;
a step of reading and displaying/outputting the memorized display data of the first frame in the state that the dummy data on the outer side thereof is removed;
a step of reading and displaying/outputting the memorized display data of the second frame; and
a step of alternately repeating the respective steps,
wherein at least one of the position of block noise in the first frame and the position of block noise in the second frame is shifted relative to one another so as to render the block noise less noticeable.

18. A moving image reproducing method using a processor for reading encoded data recorded in a state in which a first frame comprising a plurality of blocks and a second frame comprising a plurality of blocks, chronologically continuous relative to the first frame and additionally provided with dummy data of N pixels in width (N is an integer) on an outer side thereof are included in the encoded data, expanding the read encoded data by means of JPEG method and reproducing the expanded encoded data as image data, wherein
the image data whose first frame is expanded is reproduced as it is, and the image data whose second frame is expanded is reproduced in the state that the dummy data on the outer side thereof is removed,
wherein at least one of the position of block noise in the first frame and the position of block noise in the second frame is shifted relative to one another so as to render the block noise less noticeable.

19. A moving image reproducing method including using a processor for implementing the steps of:
a step of reading encoded data of a first frame;
a step of expanding the read encoded data of the first frame and memorizing the expanded encoded data as display data;
a step of reading encoded data of a second frame additionally provided with dummy data of N pixels in width (N is an integer) on an outer side thereof;
a step of expanding the read encoded data of the second frame and memorizing the expanded encoded data as display data;
a step of reading and displaying/outputting the memorized display data of the first frame;
a step of reading and displaying/outputting the memorized display data of the second frame in the state that the dummy data on the outer side thereof is removed; and
a step of alternately repeating the respective steps,
wherein at least one of the position of block noise in the first frame and the position of block noise in the second frame is shifted relative to one another so as to render the block noise less noticeable.

20. A moving image reproducing method as claimed in any of claims 14, 16 and 17, wherein a size of the block is by eight pixels –eight pixels and the N is a multiple of four.

21. A moving image reproducing method as claimed in any of claims 16 through 19, wherein motion JPEG format is employed as a format of compressing the image data.

22. A moving image reproducing apparatus comprising:
a JPEG expanding device for reading and expanding encoded data of a first frame additionally provided with dummy data of N pixels in width (N is an integer) on an outer side thereof and encoded data of a second frame chronologically continuous relative to the first frame and not provided with the dummy data;
a display data memorizing device for memorizing the data of the first frame and the second frame expanded by the JPEG expanding device as display data; and
a display data reading device for reading and displaying/outputting the display data of the first frame memorized in the display data memorizing device in the state that the dummy data on the outer side thereof is removed and reading and displaying/outputting the display data of the second frame,
wherein at least one of the position of block noise in the first frame and the position of block noise in the second frame is shifted relative to one another so as to render the block noise less noticeable.

23. A moving image reproducing apparatus comprising:
a JPEG expanding device for reading and expanding encoded data of a first frame not provided with dummy data and encoded data of a second frame chronologically continuous relative to the first frame and additionally provided with dummy data of N pixels in width (N is an integer) on an outer side thereof;
a display data memorizing device for memorizing the data of the first frame and the second frame expanded by the JPEG expanding device as display data; and a display data reading device for reading and displaying/outputting the display data of the first frame memorized in the display data memorizing device and reading and displaying/outputting the display data of the second frame in the state that the dummy data on the outer side thereof is removed,
wherein at least one of the position of block noise in the first frame and the position of block noise in the second frame is shifted relative to one another so as to render the block noise less noticeable.

24. A moving image reproducing apparatus as claimed in claim 22 or 23, wherein motion JPEG format is employed as a format of compressing the image data.

* * * * *